UNITED STATES PATENT OFFICE.

ABRAM BROODSKY, OF MONTREAL, CANADA.

PROCESS OF TREATING PLASTER-OF-PARIS CASTS.

SPECIFICATION forming part of Letters Patent No. 623,978, dated May 2, 1899.

Application filed March 3, 1898. Serial No. 672,430. (No specimens.)

*To all whom it may concern:*

Be it known that I, ABRAM BROODSKY, a subject of the Czar of Russia, and a resident of the city and district of Montreal, Province of Quebec, Canada, have invented a certain new and useful Process of Treating Plaster-of-Paris Casts in Order to Form a Liquid-Proof Surface, of which the following is a specification.
In the printing of fibrous materials—such as silks, &c.—as well as other purposes, it is found advantageous to first form the casts of plaster-of-paris, and afterward obtain transfers therefrom, the transfers being used for the printing. This requires that two transfers be made for each cast in order that the design may be originally shown on the cast. This requires a great deal of additional labor incurred in the making of the transfers.
As it is impossible to print from the plaster cast direct, owing to its porous formation, these transfers must be made or the plaster receive a coating by which the pores will be closed against any entry of the ink or other pigment used.

The object of my invention is therefore to form a surface on the plaster casts which will enable the user to print direct from the cast and which will allow of the molding of transfers of certain materials, such as glue, not otherwise possible by reason of the characteristics or elements of these materials.

In practicing my invention I first prepare the plaster cast in any suitable manner. I then place a quantity of beeswax into a pan, which is then heated until the wax becomes melted or soft. The plaster cast, still "green," with but sufficient hardness to keep its shape, is then dipped into the melted wax, the plaster absorbing a quantity of the wax, closing up the pores, which causes the water to be driven out, in addition to which the face of the cast acquires a smooth surface upon which ink and other pigments can be placed without becoming absorbed and making it suitable to be printed from. By thus coating the plaster-of-paris I am enabled to form a matrix by which it is possible to make a suitable printing-plate formed of melted glue, which will harden and form a plate from which it will be possible to print it in a manner similar to ordinary type or stereotyped plates.

In order that the cast having the treated face may be used in a press, I preferably place the lower portion of the mold, which has not been treated with the wax coating, in a solution of alum by means of which the base or lower portion becomes extremely hard and can be used under great pressure.

The surface of the finished cast, while smooth, does not become hardened, the waxed surface readily receiving the ink and pigments, but preventing their absorption into the mold, the printing obtained being clear-cut, &c.

Having thus described my invention, what I claim as new is—

As a new article of manufacture, a plate for printing comprising a plaster-of-paris base, having its top printing-face impregnated with beeswax, whereby pigments, &c., will be prevented from passing into the base and are readily transferred from the plate to the article being printed, substantially as described.

In witness whereof I have hereunto set my hand in the presence of two witnesses.

ABRAM BROODSKY.

Witnesses:
   J. A. MARION,
   HORACE G. SEITZ.